United States Patent
Reuber

[15] 3,700,036
[45] Oct. 24, 1972

[54] GROUND WHEEL DRIVEN OSCILLATING HARROW

[72] Inventor: August Reuber, 2790 Charlotte Street, Albany, Oreg. 97321

[22] Filed: Aug. 7, 1970

[21] Appl. No.: 61,997

[52] U.S. Cl. ................172/105, 172/110, 172/117, 172/456
[51] Int. Cl. ............................................A01b 39/10
[58] Field of Search............................172/48, 50–51, 172/53–54, 59, 97, 101–102, 110–111, 117, 311, 105, 456

[56] References Cited

UNITED STATES PATENTS

| | | |
|---|---|---|
| 1,374,474 | 4/1921 | Schwab et al..............172/105 |
| 3,333,645 | 8/1967 | Gustafson..................172/311 |
| 3,452,824 | 7/1969 | Carlson ........................172/54 |
| 1,355,638 | 10/1920 | Bollinger...................172/110 |
| 2,828,597 | 4/1958 | Moore......................172/311 |
| 66,684 | 7/1867 | Densmore ................172/110 |
| 393,801 | 12/1888 | Weeks et al. ..............172/110 |
| 2,280,372 | 4/1942 | Carlson .......................172/59 |

Primary Examiner—Robert E. Pulfrey
Assistant Examiner—C. W. Hanor
Attorney—Kimmel, Crowell & Weaver

[57] ABSTRACT

An agricultural implement in which spaced apart, concentric rings carry depending harrow points, the rings being subjected to oscillatory movement during operation by a pitman crank and sway bar actuated responsive to movement of the implement. The rings are adapted to folding to transport positions, and are also elevated for transport.

1 Claim, 11 Drawing Figures

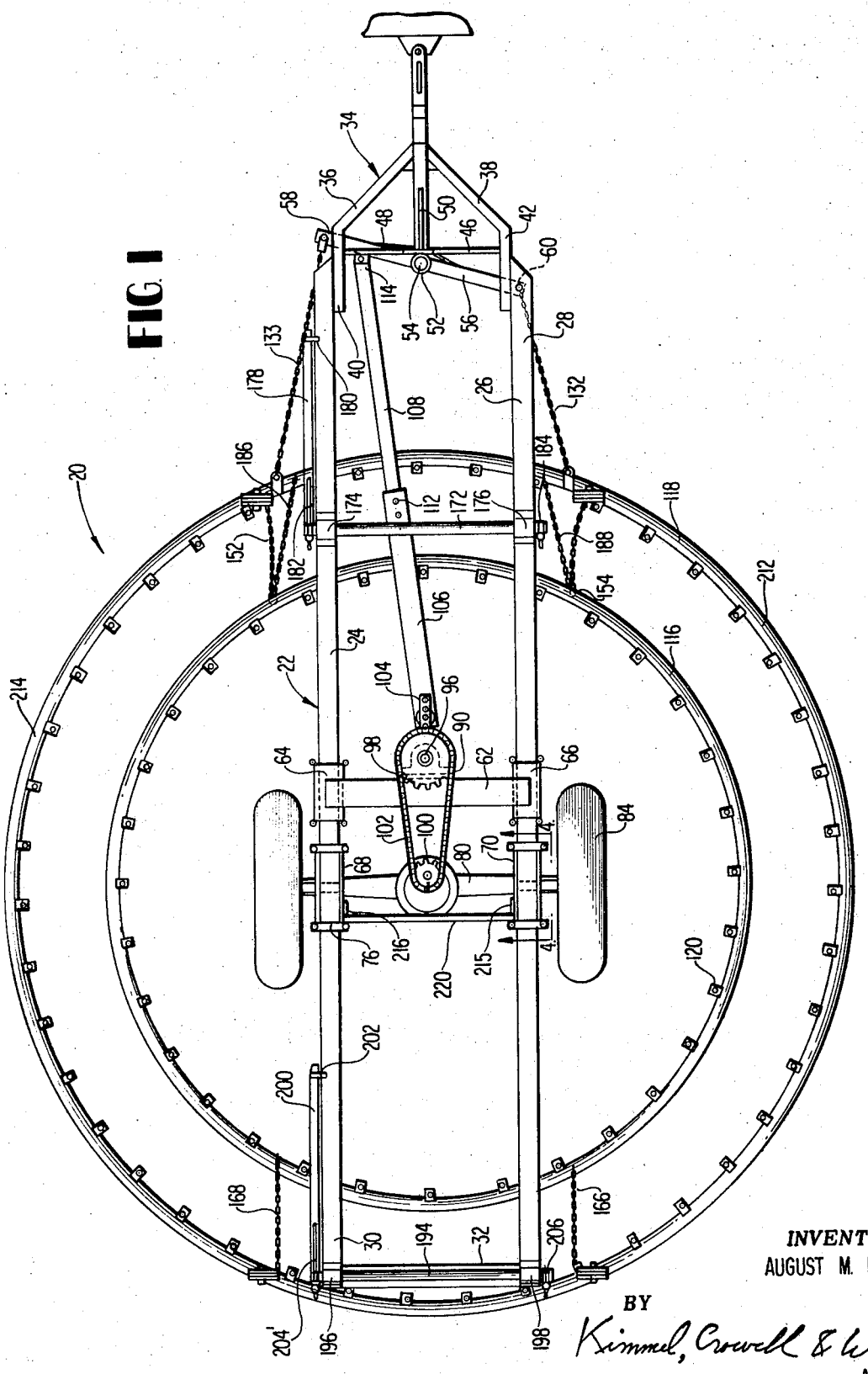

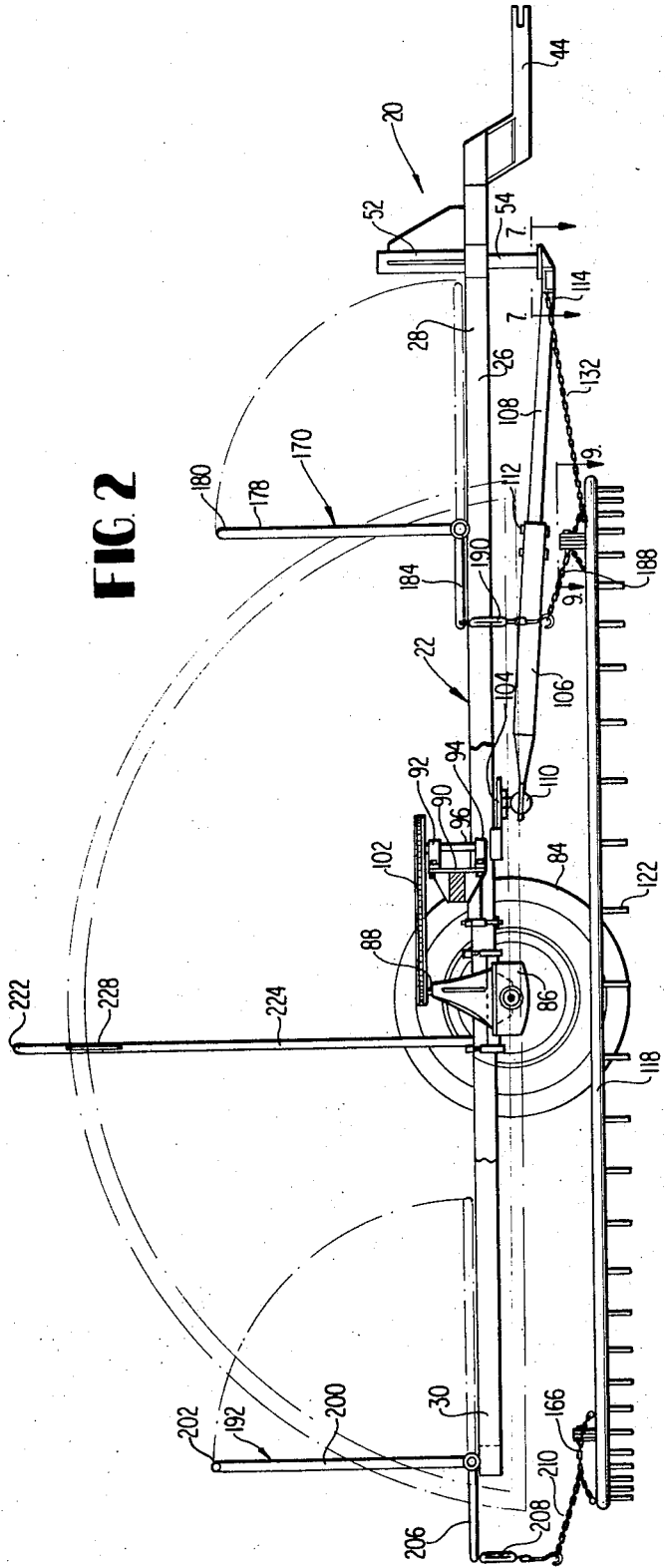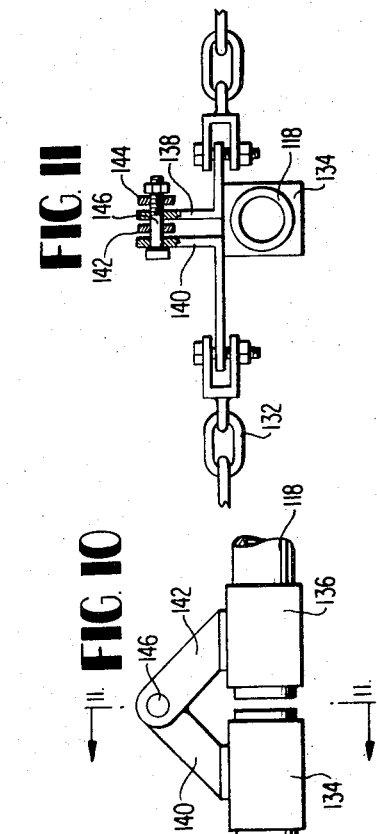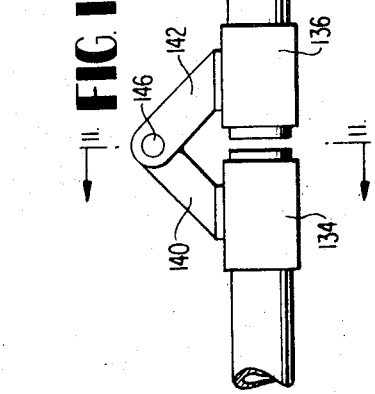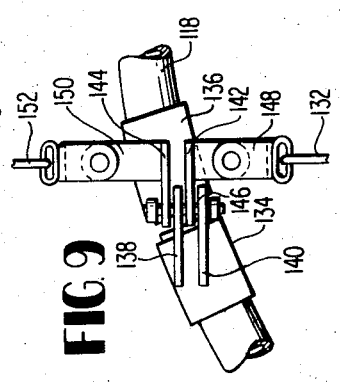

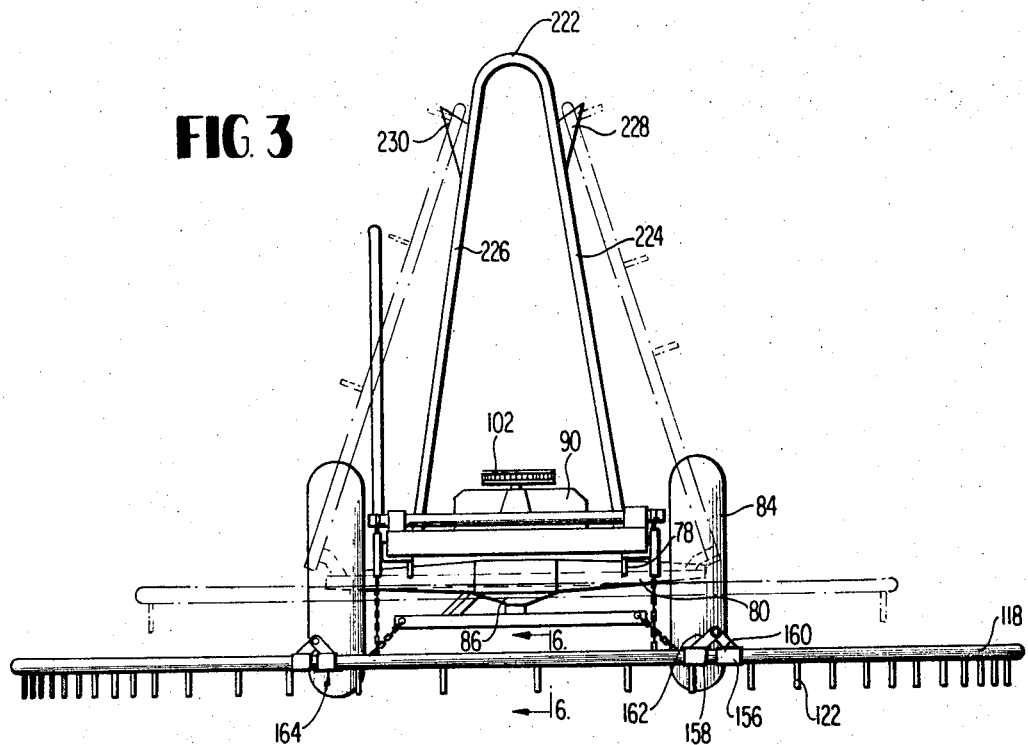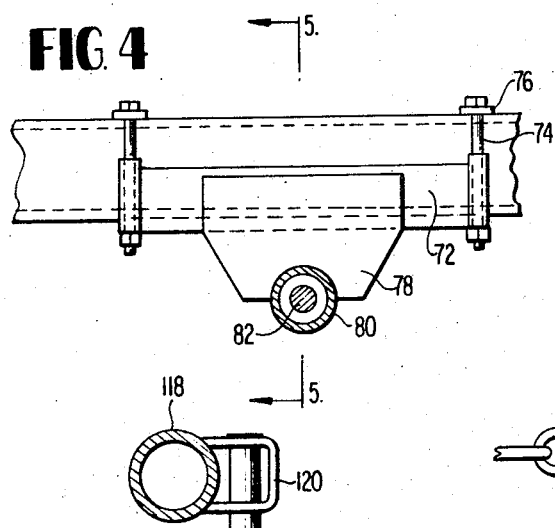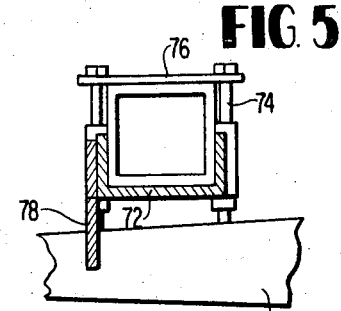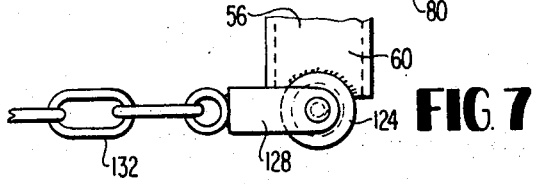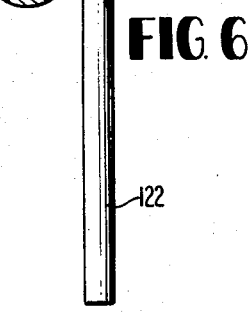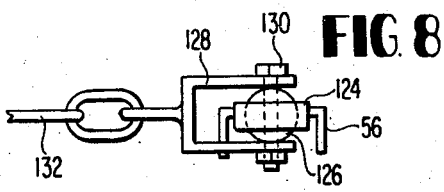

3,700,036

1

GROUND WHEEL DRIVEN OSCILLATING HARROW

BACKGROUND OF THE INVENTION

1. Field of the Invention

This invention relates to a harrow of the type adapted to soil levelling and to stubble crushing, and to general harrow functions of cultivation, soil smoothing and pulverizing.

2. Statement of the Prior Art

It has heretofore been known to provide harrow assemblies in which concentric rings carrying depending teeth are oscillated in rotary fashion during a pulling procedure. Prior U.S. Pat. No. 3,066,744 shows a successful device of that nature.

SUMMARY OF THE INVENTION

The present invention relates to improved means for imparting rotary oscillatory movement to concentric harrow rings, and to means for effectively and conveniently transporting the assembly from place to place. The invention provides a gear or sprocket drive, the rotation of which is corelated to the support wheels for the harrow whereby the oscillation of the rings is a function of the speed of movement of the harrow. The unit is provided with interchangeable gears, and thus, consistency of the rate of oscillation is achieved by a gear change if soil conditions specify faster or slower movement of the implement.

A feature of substantial importance in the invention concerns its ability to pulverize stubble remaining in grain fields after harvest. In the past, it has been necessary to destroy this stubble by burning prior to recultivation, thus materially adding to air pollution in agricultural areas. Such pollution is presently to be banned by law in many areas. The present invention obviates that problem of pollution by eliminating the need for burning of the stubble.

Among the additional advantages of the invention are its self-cleaning features, the durability of its construction, and the fact that it calls for very little service or maintenance.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a top plan view of a harrow constructed and assembled in accordance with the teachings of this invention;

FIG. 2 is a side elevational view of the harrow showing in phantom lines the manner for elevating and folding of the harrow rings;

FIG. 3 is a rear elevational view of the apparatus;

FIG. 4 is an enlarged, detail sectional view taken substantially on the plane of line 4—4 of FIG. 1, looking in the direction of the arrows;

FIG. 5 is a sectional view on line 5—5 of FIG. 4, looking in the direction of the arrows;

FIG. 6 is an enlarged sectional view taken on line 6—6 of FIG. 3, looking in the direction of the arrows;

FIG. 7 is an enlarged view of a chain connection means with the sway bar on the approximate plane of line 7—7 of FIG. 2, looking in the direction of the arrows;

FIG. 8 is a side elevational view of the connection shown in FIG. 7;

FIG. 9 is an enlarged detail view on line 9—9 of FIG. 2, looking in the direction of the arrows;

FIG. 10 shows the hinge connection of FIG. 9 from the side; and

FIG. 11 is a sectional view on line 11—11 of FIG. 10, looking in the direction of the arrows.

DESCRIPTION OF THE PREFERRED EMBODIMENT

Referring to the drawing in more detail, a harrow representative of the concepts of the present invention is therein identified by reference numeral 20. The harrow includes a main frame 22 of elongated form having a pair of laterally spaced side frame members 24 and 26. The frame has a forward end section 28 and a trailing end section 30, and the side frame members are spanned by a rear end frame member 32, and are connected at the forward end of the frame by a draft yoke 34. The yoke 34 includes angle members 36 and 38, with side members 40 and 42 fixed to the side frame members, and a forward draw bar 44 secured in use of the device to a prime mover. The yoke further includes upstanding angle plates 46, 48 and 50 which stabilize a vertical sleeve 52. Projecting from the sleeve 52 in the direction of the ground is a shaft 54.

Fixed on the lower end of the shaft 54 is a transverse sway bar 56. The bar has opposite ends 58 and 60 and comprises an important structural feature of the invention as appears below in more detail.

Mounted intermediate the ends of the side frame members is a transverse cross brace 62. The brace spans the side frame members, and is secured adjustably thereto on end saddles 64 and 66. Also mounted on saddles 68 and 70 secured to the side frames 24 and 26 is an axle mounting means. Each of the last named saddles includes a box member 72 embracing the respective side frame members, and having bolt assemblies 74 with top clamps 76 to adjustably hold the box member in place. In FIGS. 4 and 5, it will be observed that the plate 78 depends from the box, and is fixedly engaged to an axle housing 80. Disposed within the housings 80 are axles 82 conventionally secured to outboard ground wheels 84.

A differential gear housing 86 is located between the sections 80 of the axle housings, and has a gear system (not shown) of the usual type. Projecting from the housing is a vertical shaft 88. Referring again to the cross brace 62, a plate 90 is mounted thereon and has outwardly projecting bearing clamps 92 and 94. Disposed in the bearing clamps is a vertical drive shaft 96. The shaft 88 and the drive shaft 96 are longitudinally aligned, and the drive shaft has a first horizontally mounted gear or sprocket 98 thereon. The shaft 88 carries a second sprocket 100, of reduced diameter relative to the first sprocket, and a roller chain 102 is trained about the sprockets. It is an important feature of the invention that the sprockets be changeable, whereby the speed of movement of the chain may be adjusted where desirable.

Projecting outwardly from the drive shaft at its lower extremity is an arm 104 having a plurality of openings formed therein and comprising a crank means. An elongated pitman arm 106, having a telescoping section 108, is secured, at a ball joint connection 110, to a selected position on the arm. The length of the pitman is variable by reason of the telescoping construction, and bolt means 112 is employed to lock the pitman at the desired length. The opposite end 114 of the pitman is pivotally secured to the sway bar 56 at an off-center location. The arm 104, pitman 106 and sway bar 56 form a crank assembly, alternate pivoting motion being imparted to the sway bar upon rotation of the drive shaft 96 responsive to movement of the apparatus.

The harrow further comprises a plurality of concentric harrow rings, including in this illustrated form of the invention, an inner ring 116 and an outer ring 118. As shown in FIG. 6, the rings are of tubular construction, and have U-form brackets 120 at spaced intervals. The brackets have harrow teeth 122 fixed therein. The rings are secured to the main frame by flexible means, such as the chain means hereinafter described. Referring to FIGS. 2, 7 and 8, the sway bar 56, at its ends 58 and 60, is provided with annular connectors 124 having a central pivot ball 126 with a pivotal clevis 128 secured thereto by a changeable fastener 130. Link chains 132, 133 extend from the clevises to their respective connections with the outer ring 118 as shown in FIGS. 9 through 11. In the latter figures, it will be noted that the outer ring is provided with hinge mechanisms adjacent the chain connection locations, comprising adjacent sleeve blocks 134, 136, each having upstanding hinge arms. The hinge arms of the block 134 are designated at 138, 140, while those on the block 136 are designated 142, 144. The arms have co-aligned openings formed in their ends, and a hinge pin 146 extends therethrough. Side plates 148 and 150 extend laterally from the arms 142 and 144, the plates 148 being connected to the chains 132 and 133, respectively. A chain 152 extends to a suitable connector on the inner ring 116, as at 154.

Both the forward and rear end portions of the frame are provided with lever means for lifting the harrow rings for transport. The outer ring 118, as shown in FIG. 3, has rear connector blocks 156, 158, with hinge arms 160 and 162, similar to the arrangement at the forward end and duplicated, at 164, at the opposite side, the forward and rear connector blocks being longitudinally aligned in pairs, and defining foldable side segments of the outer ring 118. The inner and outer rings 116 and 118 are connected at their trailing portions inboard of the foldable segments by chains 166, 168. The lever means comprise a forward lever assembly 170 having a cross bar 172 mounted in bearings 174, 176 on the side frames 24 and 26, with a longitudinal stop member 178 at one side thereof. The stop member has an inward lug 180 which contacts the frame member 24 when the lever is in elevated position. Lever arms 182, 184 are fixed to the bar 172 and are connected to chains 186, 188 by connectors such as turnbuckles 190. The chains 186 and 188 are in turn connected to the chains 152 linking the inner and outer rings inboard of the foldable segments. Similarly, the rear lever assembly 192 includes a cross bar 194 mounted in bearings 196, 198, a stop member 200 with a lug 202, and lever arms 204, 206. As shown in FIG. 2, the lever arms are connected, as by turnbuckles 208, to chains 210 secured to the respective linking chains 166 and 168. Thus by actuation of the levers to the positions wherein the lugs 180 and 202 contact the side frame 24, the rings are elevated to a transport position in which the teeth 122 are spaced from contact with the ground.

As indicated above, the ring 118 includes foldable outer segments, identified for reference herein by numerals 212 and 214. Mounted on the frame at 215, 216 is a rack 220 of inverted U-form having an apex 222 and sides 224, 226. Cleats 228, 230 are provided, and when the foldable segments 212 and 214 are placed in the substantially vertical transport positions shown in phantom lines in FIG. 3, the cleats aid in maintaining the same in position.

The operation of the apparatus involves towing by a suitable prime mover causing the area to be cultivated. Assuming the harrow rings to be lowered to a ground contact position, towing across the area actuates the differential gears within the housing 86, rotating the shaft 88 and driving the sprocket 100 and chain 102. This results in rotation of the sprocket 98 and drive shaft 96 with consequent crank arm movement of the arm 104 resulting in reciprocating actuation of the pitman 106. This motion is imparted to the sway bar 56 which exerts alternate force on the chains 132, 133, causing oscillating motion of a rotary character to be imparted to the inner and outer rings.

I claim:

1. A harrow comprising:
    an elongated main frame having spaced apart side frame members and transverse frame members;
    the main frame having a forward end section with a tow yoke spanning the side frame members, and having a trailing end section;
    a harrow assembly including a plurality of concentric rings each having a series of depending harrow points secured thereto;
    an axle assembly, comprising an axle transverse to the side frame members, ground wheels, and a differential gear assembly, the axle assembly supporting the main frame intermediate said forward and trailing end sections;
    a cross brace spanning the side frame members forward of the axle assembly, and carrying a vertical drive shaft with a first horizontally mounted sprocket;
    a second vertical shaft projecting from the differential gear assembly and having a second horizontally mounted sprocket therein spaced from the first sprocket, the second sprocket being of reduced diameter relative to the first sprocket;
    a drive chain trained about the first and second sprockets and driven by the differential gear assembly responsive to movement of the harrow;
    an arm extending outwardly from the vertical drive shaft;
    a pitman, having opposite ends, connected to the arm at one of said ends;
    a sway bar pivotally mounted on the main frame adjacent the forward end section;
    the outer end of the pitman being connected to the sway bar to alternately pivot the sway bar about the pivot thereof upon rotation of the drive shaft; and
    chains extending from the ends of the sway bar to spaced locations on the rings whereby alternate pivoting motion of the sway bar is transmitted to the rings.

* * * * *